United States Patent
Misch et al.

(10) Patent No.: US 9,630,533 B2
(45) Date of Patent: Apr. 25, 2017

(54) SWITCH FOR SELECTING AND ADJUSTING SEAT-RELATED FUNCTIONS OF MOTOR VEHICLE SEATS

(71) Applicant: FORD GLOBAL TECHNOLOGIES, LLC, Dearborn, MI (US)

(72) Inventors: Philipp Misch, Aachen NRW (DE); Jeroen Lem, Maastricht (NL); Johnathan Andrew Line, Northville, MI (US); Stefan Wolter, Wuerselen NRW (DE); Florian Golm, Herzogenrath (DE)

(73) Assignee: Ford Global Technologies, LLC, Dearborn, MI (US)

( * ) Notice: Subject to any disclaimer, the term of this patent is extended or adjusted under 35 U.S.C. 154(b) by 104 days.

(21) Appl. No.: 14/642,832

(22) Filed: Mar. 10, 2015

(65) Prior Publication Data
US 2015/0251573 A1   Sep. 10, 2015

(30) Foreign Application Priority Data

Mar. 10, 2014  (DE) .................. 10 2014 204 321

(51) Int. Cl.
*B60N 2/44* (2006.01)
*A61H 9/00* (2006.01)
(Continued)

(52) U.S. Cl.
CPC ......... *B60N 2/4415* (2013.01); *A61H 9/0078* (2013.01); *B60N 2/0228* (2013.01);
(Continued)

(58) Field of Classification Search
CPC ... G06F 3/0412; B60N 2/4415; B60N 2/0228; B60N 2/665; B60N 2/448; A61H 9/0078;
(Continued)

(56) References Cited

U.S. PATENT DOCUMENTS 6,299,250 B1 *  10/2001  Orizaris ............... B60N 2/0228
                                                    297/284.6
D553,577 S *    10/2007  Seed ........................... D13/162
(Continued)

FOREIGN PATENT DOCUMENTS

DE     19534660 C1 *   2/1997    ............ A47C 7/467
DE     19922409 A1    11/2000
(Continued)

OTHER PUBLICATIONS

Ford Motor Company, 2010 Taurus Multi-Contour Seats Merge Medical Know-How, Smart Design to Reduce Driver Fatigue, Asheville, North Carolina, Jun. 15, 2009.

*Primary Examiner* — Milton Nelson, Jr.
(74) *Attorney, Agent, or Firm* — Frank MacKenzie; Bejin Bieneman PLC

(57) ABSTRACT

A motor vehicle seat has a seat inflation system for selectively inflating/deflating a plurality of inflatable cushions in the seat back and/or bottom. A switch for controlling the system includes a display having a first symbol indicating a function of the cushion and a second symbol indicating a parameter of the active function, a plurality of keypads defining a circular perimeter surrounding the display and actuatable to select the active function, and a ring surrounding the perimeter and rotatable to adjust a value of the parameter.

20 Claims, 3 Drawing Sheets

(51) Int. Cl.
*B60N 2/02* (2006.01)
*G06F 3/041* (2006.01)
*H01H 13/14* (2006.01)
*B60N 2/66* (2006.01)

(52) U.S. Cl.
CPC .............. *B60N 2/448* (2013.01); *B60N 2/665* (2015.04); *G06F 3/0412* (2013.01); *H01H 13/14* (2013.01); *A61H 2201/0149* (2013.01); *A61H 2201/0207* (2013.01); *A61H 2201/0214* (2013.01); *A61H 2201/164* (2013.01); *A61H 2201/1609* (2013.01); *A61H 2201/1623* (2013.01); *A61H 2201/1628* (2013.01); *A61H 2201/5002* (2013.01); *A61H 2201/5043* (2013.01); *A61H 2201/5046* (2013.01); *A61H 2201/5058* (2013.01)

(58) Field of Classification Search
CPC ...... A61H 2201/164; A61H 2201/0149; A61H 2201/1623; A61H 2201/1628; A61H 2201/0214; A61H 2201/5002; A61H 2201/5043; A61H 2201/5046; A61H 2201/5058; A61H 2201/1609; A61H 2201/0207; H01H 13/14

USPC .......................... 715/769; 297/284.6, 452.41
See application file for complete search history.

(56) References Cited

U.S. PATENT DOCUMENTS

| 8,678,500 B2 | 3/2014 | Lem et al. | |
|---|---|---|---|
| 2004/0196265 A1* | 10/2004 | Nohr | G06F 1/1626 345/169 |
| 2014/0319231 A1* | 10/2014 | Matsuoka | G05D 22/02 236/51 |

FOREIGN PATENT DOCUMENTS

| DE | 19946021 A1 | * 11/2000 | ........... B60N 2/0228 |
|---|---|---|---|
| DE | 10012758 A1 | * 9/2001 | ........... B60N 2/0228 |
| DE | 10035206 C1 | * 12/2001 | ........... B60N 2/0228 |
| EP | 1389559 A2 | 2/2004 | |
| EP | 1564066 A1 | 8/2005 | |
| EP | 1839932 A2 | 10/2007 | |
| GB | 2535535 A | * 8/2016 | ........... B60N 2/0228 |
| JP | 2010179759 A | * 8/2010 | ........... B60N 2/0228 |

* cited by examiner

SWITCH FOR SELECTING AND ADJUSTING SEAT-RELATED FUNCTIONS OF MOTOR VEHICLE SEATS

CROSS-REFERENCE TO RELATED APPLICATIONS

This application claims foreign priority benefits under 35 U.S.C. §119(a)-(d) to DE 10 2014 204 321.2 Mar. 10, 2014, which is hereby incorporated by reference in its entirety

TECHNICAL FIELD

The invention relates to a switch for selecting and adjusting functions related to motor vehicle seats having cushions that may be controllably inflatable and deflatable.

BACKGROUND

EP 1 564 066 A1 discloses that motor vehicles, in particular passenger cars, are equipped with seats which, in addition to the adjustment options, also have massage functions. Massage seats of this kind are feasible not only for the driver and front-seat passenger, but also for back-seat passengers.

Operator control of the massage functions is may be complicated depending on the configuration of the massage programs and options.

Therefore, to date, two general concepts have been commonly used for the complicated operator control. Firstly, graphical screen-assisted operator control by means of a central interface on the dashboard, and secondly conventional operator control by means of dedicated switches on or near the seat itself, said switches each being assigned to specific functions.

Therefore, EP 1 389 559 A2, DE 199 22 409 B4 describe the use of switches to control seat-related functions. EP 1 839 932 B1 describes the use of a rotatable 4-way switch with surrounding operating keys, said 4-way switch allowing relatively complex massage functions to be controlled in connection with an additional screen display However, a more user-friendly and intuitive option for controlling complex inflation-related functions of seats, in particular massage functions of motor vehicle seats, without the use of graphical screens on the dashboard, is desirable. In particular, it should be possible for the rear seats in the back to also be controlled by the passengers in the back.

SUMMARY

According to the invention, it has been identified that, when the switch for selecting and adjusting inflation-related functions of motor vehicle seats has a substantially circular shape and a flat end face, with at least two keypads for selecting the function which is to be activated and controlled being arranged on the end face and an adjustment ring for adjusting a parameter of the selected function being arranged around the circumference of the circular shape, a compact arrangement together with intuitive operator control is provided. In addition, a large number of inflation-related functions can be controlled in a small space using a switch of this kind. Therefore, the switch can also be used in the back of vehicles in which there is traditionally little space for switches. The switch can also be arranged in the region of the doors.

When further keypads are arranged concentrically around the circular shape, additional options can be operated by directly operating the keypads.

In a disclosed embodiment, a display is arranged in the center of the flat end face, and the keypads are arranged around the display. This allows an intuitive operator control concept with direct operator control of a large number of functions to be implemented together with a relatively small installation space. This is the case particularly when the display is of approximately square design and the keypads are arranged between the central square and the circular circumference.

The display may be a touchscreen, whereby it is possible for the status of the functions both to be displayed and also to be directly changed in a context-dependent manner. In addition to the adjustment ring for reducing or increasing a selected parameter of the selected function, this allows direct and intuitive control of inflation-related functions, in particular of the rear seats where, for logical reasons, it is not possible to use a view of a central display in the dashboard for control purposes.

The invention may also be expressed by a corresponding method for selecting and adjusting inflation-related functions of motor vehicle seats by means of the above-described switch, with a changeover being made between the inflation-related functions by means of the keypads and the adjustment ring allowing the selected function to be adjusted.

In this case, the function of the keypads can change in a firmly prescribed, freely programmable or context-dependent manner. In particular, the keypads allow the inflation-related functions, such as seat adjustment, lumbar support, massage functions and/or the seat itself to be selected. In other words, the function is preferably selected by means of the keypads and the intensity of a parameter of the function is varied by means of the adjustment ring. In the case of the seat selection, a keypad for selecting or specifying the seat to be controlled can also be used.

When a massage function is selected, the display can display the settings of one or more parameters of said massage function and, if said display is a touchscreen etc., also may allow said settings to be changed.

Further features and details of the invention can be found in the following description of the drawing, in which:

DETAILED DESCRIPTION

As required, detailed embodiments of the present invention are disclosed herein; however, it is to be understood that the disclosed embodiments are merely exemplary of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
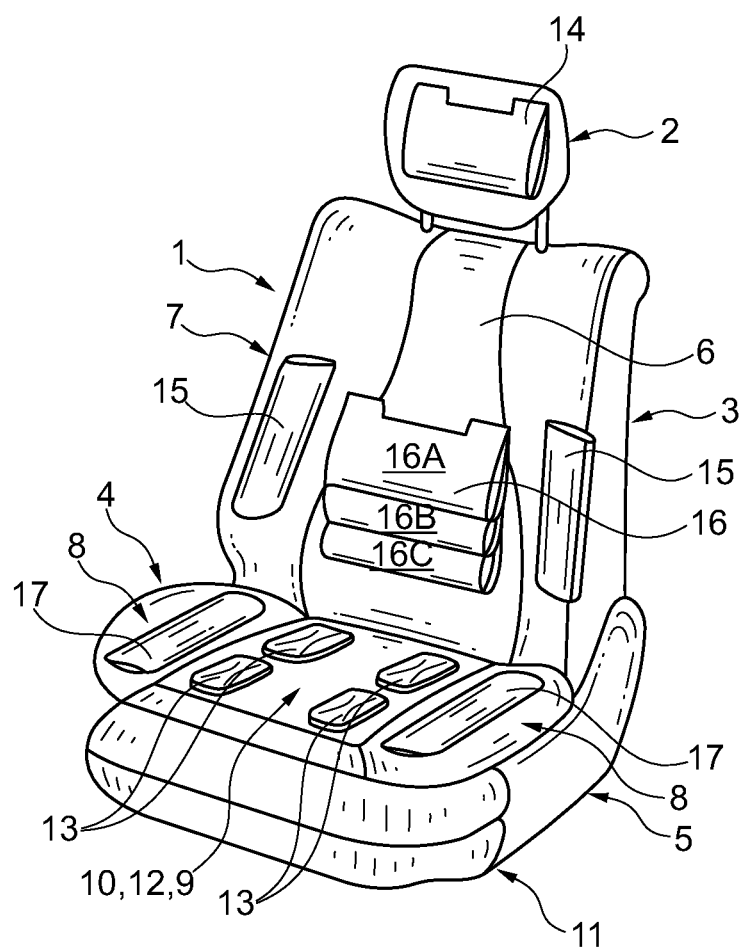
FIG. 1 shows a perspective, transparent view of a known seat having an inflation system.

For illustration and better understanding, FIG. 1 schematically shows an oblique perspective view of a seat, designated 1 overall, having a seat cushion inflation system operative to perform a variety of inflation-related functions, such as massage or lumbar/lateral support, with the transparency allowing a view into the interior of the seat. The seat 1 comprises a headrest 2 which is attached to the top of a backrest 3 which, in turn, is coupled to the seat bottom 4 by means of an adjustable hinge 5. In this case, the seat 1 is supported by a sheet-steel frame 11 which is arranged beneath the actual seat surface and is connected to the vehicle.

The backrest 3 has an anatomically shaped pad 6, which is approximately S-shaped in longitudinal section, for the occupant's back, said pad being delimited at the sides by protruding ribs 7 which provide the occupant with lateral support.

The seat bottom 4 likewise has a pad 9 which defines the seating surface. Ribs 8 which protrude at the sides and provide the occupant with lateral support, in particular when traveling around bends, are also provided here.

The pad 9 is formed from a foam block 10 which is composed of a suitable natural and/or artificial material which, if appropriate, is covered with a suitable material, such as leather. The pad has to have the customary and known properties, such as cushioning, damping, transportation of moisture, etc. Furthermore, it is possible to provide heating and/or cooling apparatuses in the pad.

A supporting plate 12 made of stiff material is provided beneath the foam block 10. In this case, the supporting plate 12 is arranged below the rear region of the seat surface where the occupant's posterior usually rests. However, for reasons of clarity, the supporting plate 12 is not shown, that is to say is illustrated in a transparent manner, in FIG. 1.

An extremely important feature of the seat according to FIG. 1 is the presence of a seat inflation system comprising four inflatable air cushions 13 below the actual seat 9 between the supporting plate 12 and the frame 11. In this case, the air cushions are arranged in such a way that they lie below the corners of the approximately rectangular seat surface.

The four air cushions 13, the inflation/deflation of which can be controlled and can be acted on independently of one another, below the supporting plate 12 allow, in addition to the vertical positioning, tilting of the supporting plate 12 about two axes which run parallel to the plane of the seat surface and perpendicular to one another. Tilting of the pelvis in the direction from the front to the rear and vice versa can therefore be produced, said tilting relieving loads on the spine and preferably being used, for example, for spinal manipulation or movement. It is precisely this tilting of the pelvis which prevents back pain. This movement can be coupled to a tilting movement from left to right, and therefore particularly good avoidance of fatigue is achieved by the alternating, cyclic tensioning and relaxing of the muscles which is caused by the movement of the pelvis. This described operation of the air cushions and related control system is referred to herein as "active motion."

The vertical travel of the individual air cushions 13 is preferably in an approximate range of between 5 mm and 30 mm, with the greater travel being used only for the height adjustment.

It is possible to program, pre-specify and manually or automatically select suitable pressure profiles using corresponding software. This will be discussed in greater detail below.

An advantageous control cycle of the air cushions comprises a U-shaped profile of the pressure wave and of the action on the air cushions 13. In one example case, the cycle may progress from the front to the rear and from left to right (for example, from front-left to rear-left to rear-right to front-right to rear-right to rear-left to front-left) and may last approximately 1 min.

The four cushions 13, which permit the damping and/or firmness of the seat to be adjusted and improved even during driving by means of a controller, valves and compressor by means of the air pressure which is applied, are therefore located beneath the supporting plate 12 and above the frame 11, that is to say between the supporting plate 12 and the frame 11. The controller can automatically regulate the air pressure in the individual air cushion 13 after evaluation of data which originates from sensors and relates to the driving situation and the occupant. A seat having such a controller, sensors, and cushions is taught in U.S. Pat. No. 8,678,500B2, the disclosure of which is incorporated herein by reference.

In addition, the inflation system of seat 1 further comprises air cushions 15, 17, 16 and 14, which serve for massage and contour adjustment, in the ribs 7 and 8, the pad 6 and the headrest 2. Said further air cushions can likewise be regulated and/or controlled by means of the controller which has already been mentioned. Furthermore, in the case of the vehicle being subject to an impact, said air cushions can be inflated and serve as additional impact protection in order to prevent contact between the occupant and the metal frame 11 of the seat.

The filling pressure of the air cushion or cushions 14 in the headrest 2 can be changed in order to provide a comfortable headrest surface for the occupant.

The filling pressure of the side air cushions 15 and 17 can be changed in order to adjust the width of the seat or the lateral support in the seat region and back region as desired. In addition, a function is provided in which the air cushions 15 and 17 of one side of the seat, specifically the exit side, can be completely emptied in order to facilitate entry and exit. This advantageously takes place through an opening in the corresponding door.

The air cushions 16 in the lumbar region serve as a lumbar support and comprise an upper, a central and a lower element 16A, 16B and 16C. These can be adjusted in terms of both filling pressure and position and shape in order to provide a comfortable lumbar support for the occupant.

The above-described selection of the respective air cushions in order to adjust them and the adjustment of said air cushions are performed with the switches which are described below, initially in structural terms, with reference to FIGS. 2 to 4.

Figure 2:
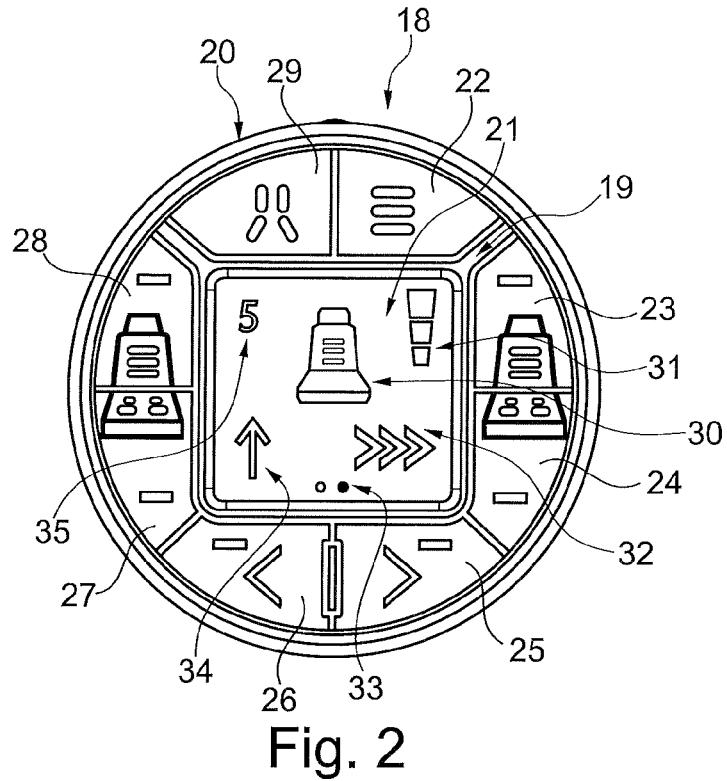
FIG. 2 shows a plan view of a switch according to the invention for controlling the inflation system of the seat from FIG. 1.

The switch, which is designated 18 overall in FIG. 2, functions to control the seat inflation system described above and comprises a substantially circular overall shape with an end face 19 which is shown in plan view in the plane of the drawing. The switch 18 may be flush with or raised relative to the surface on which the switch is located (the fastening or attachment location).

A rotatable adjustment ring 20 is arranged around the circumference of the circular perimeter defined by a plurality of keypads 22-29.

A central touchscreen display 21 and, around said touchscreen display, eight keypads 22-29 are arranged on the end face 19. In this refinement, the switch 18 is intended to permit control the both the driver seat and the passenger seat, and therefore it is positioned most conveniently centrally between the driver seat and the passenger seat, for example on the center console, armrest, etc.

The keypads 22-29 are each operative when pressed to select and/or control different functions of the seat inflation system and are provided with symbols corresponding to the respective function. By way of example in the depicted switch, keypad 22 may select a lumbar support function, and 29 may select a lateral support function.

The selected function can then be adjusted either by means of the adjustment ring 20 or alternatively via the display 21.

The display 21 provides a visual indication of the respectively selected and active function of the seat by means of symbols 30-35. The central symbol 30 indicates the active function, in this case lumbar massage by means of the lumbar air cushions 16. Symbols 31-35 indicate various parameters or settings associated with the active function. For example, with regard to the selected lumbar massage function there are at least five parameters: Symbol 31 indicates the intensity parameter. Symbol 32 indicates the speed parameter. Symbol 33 indicates the active seat, in this case the right-hand or passenger seat. Symbol 34 indicates the pattern parameter, and symbol 35 (in the illustrated case, a number) indicates the duration parameter.

Adjustment of the respective value or setting of one of the parameters indicated by symbols 31-35 is accomplished by first touching the display 21 in the vicinity of the respective symbol to select that parameter to be adjusted. The change in value or setting of the selected parameter may then be performed either by turning the adjustment ring 20 or, alternatively, by maintaining the pressure on the symbol, with, for example, changing values being run though cyclically in this case.

Figure 3:
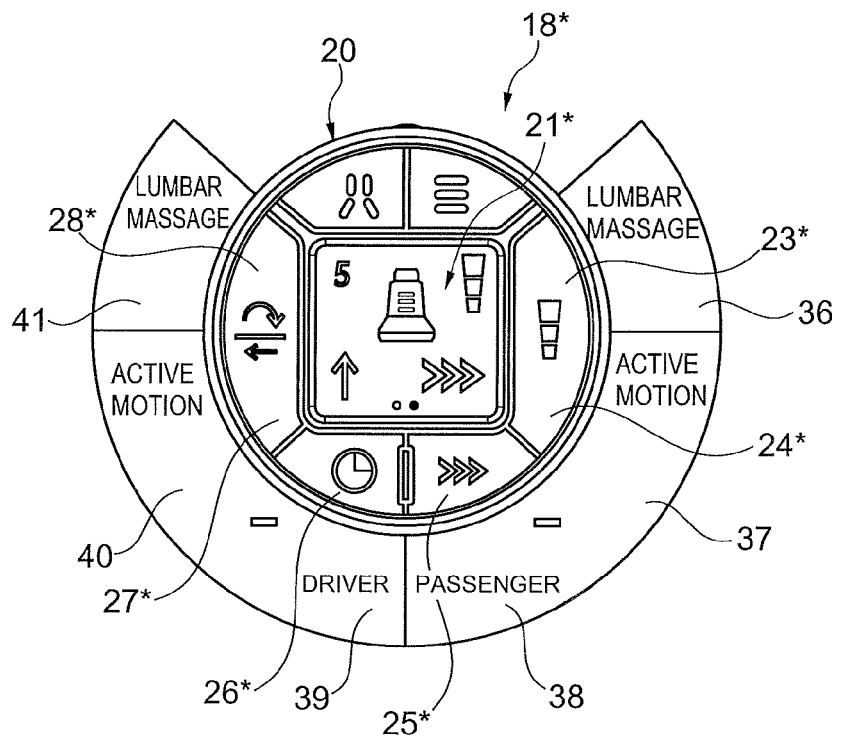
FIG. 3 shows a plan view of an alternative switch according to the invention for controlling the inflation system of the seat from FIG. 1.
Figure 4:
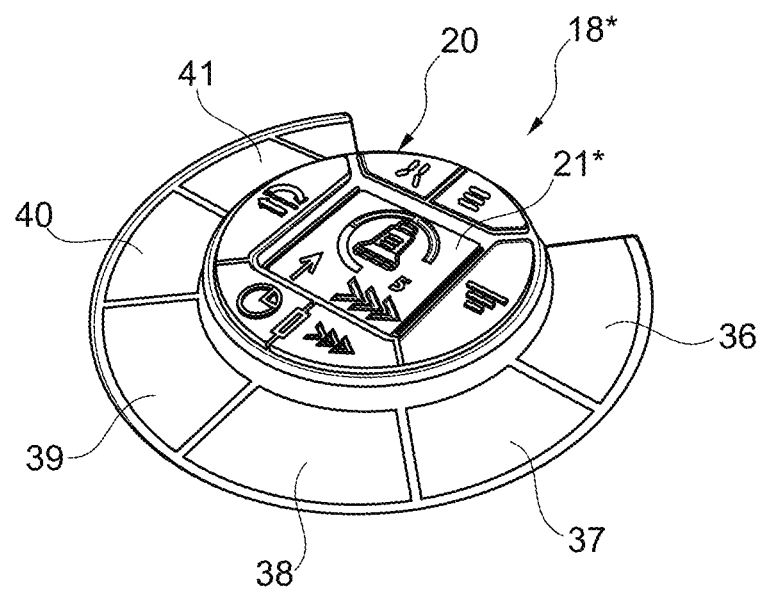
FIG. 4 shows a perspective view of the switch from FIG. 3.

FIGS. 3 and 4 show a second embodiment of the switch. The switch 18* differs from the switch 18 of FIG. 2 primarily by virtue of: 1) A second set of keypads 36-41 which are arranged concentrically around the circular perimeter of the first or inner set of keypads 23*-28*; and 2) A differing assignment of control functions to the inner keypads 23*-28*. This allows the display 21* to be used as a pure display without a touch function. These differences are discussed further below.

Therefore, keys 36 and 37 replace keys 23 and 24 respectively, and keys 40 and 41 replace keys 27 and 28 respectively. Keys 25 and 26 are now likewise replaced by keys 38 and 39 respectively. As a result, the keys 23*-28* are free to directly control or adjust other functions, parameters, and/or settings related to the seat cushion system.

Keys 23* and 24* now allow the setting or intensity of the active function to be increased or reduced. Key 25* allows the speed to be selected/adjusted, and key 26* allows the duration to be selected/adjusted. Keys 27* and 28* now adjust the pattern and the duration.

Figure 5:
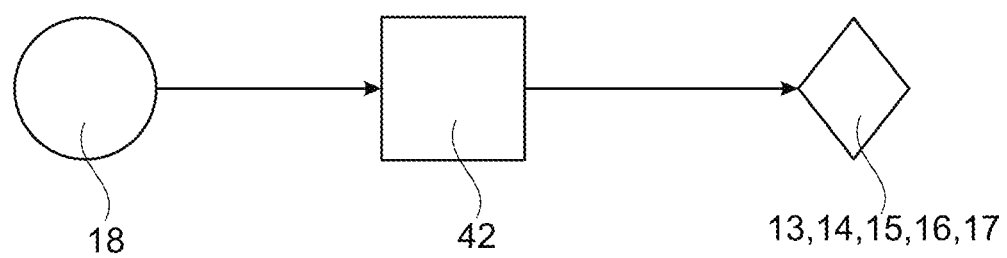
FIG. 5 is a schematic block diagram of a seat inflation system.

FIG. 5 is a block diagram of the control of the cushions 13-17 of the seat from FIG. 1 by a switch 18.

The switch 18 is electronically connected to a controller 42 (for example by means of a CAN bus), and therefore the key operation processes etc. can be registered by the controller 42 and assigned to the function etc.

After the switch 18 is operated, the controller 42 then drives the inflation/deflation of cushions 13-18 for the desired function or setting of the seat.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Apparatus comprising:
   a seat having an inflatable cushion;
   a controller controlling inflation of the cushion; and
   a switch having:
      a display having a first symbol indicating a function of the cushion and a second symbol indicating a parameter of the function;
      a plurality of keypads defining a circular perimeter surrounding the display, and actuatable to select the function; and
      a ring surrounding the perimeter and rotatable to adjust a value of the parameter.

2. The apparatus of claim 1, wherein the display is square in shape.

3. The apparatus of claim 1, wherein the plurality of keypads completely surrounds the display.

4. The apparatus of claim 1, wherein the second symbol indicates the value of the parameter.

5. The apparatus of claim 1, wherein the display is a touchscreen.

6. The apparatus of claim 5, wherein the value of the parameter may further be adjusted by touching the second symbol.

7. The apparatus of claim 1, wherein the plurality of keypads comprises a first keypad actuatable to select a lumbar massage function, and a second keypad actuatable to select a lateral support function.

8. The apparatus of claim 7, wherein when the lumbar massage function is selected, the parameter adjusted by the ring is one of an intensity, a speed, a pattern, and a duration.

9. A switch comprising:
   a display having a first symbol indicating an active function of a vehicle seat inflation system and a second symbol indicating a parameter of the active function;
   a plurality of keypads disposed around the display to define a circular perimeter, and actuatable to select the active function; and
   a ring surrounding the perimeter and rotatable to adjust a value of the parameter.

10. The switch of claim 9, wherein the display is square in shape.

11. The switch of claim 9, wherein the plurality of keypads completely surrounds the display.

12. The switch of claim 9, wherein the second symbol indicates the value of the parameter.

13. The switch of claim 9, wherein the display is a touchscreen.

14. The switch of claim 13, wherein the value of the parameter may further be adjusted by touching the second symbol.

15. The switch of claim 9, wherein the plurality of keypads comprises a first keypad actuatable to activate a lumbar massage function, and a second keypad actuatable to activate a lateral support function.

16. The switch of claim 15, wherein when the lumbar massage function is active, the parameter adjusted by the ring is one of an intensity, a speed, a pattern, and a duration.

17. A switch comprising:
- a display having a first symbol indicating an active function of a vehicle seat inflation system and a second symbol indicating a parameter of the active function;
- a first plurality of keypads disposed around the display to define a circular perimeter, and actuatable to adjust a value of the parameter;
- a ring surrounding the perimeter and rotatable to adjust a value of the parameter; and
- a second plurality of keypads disposed outside the ring and actuatable to select the active function.

18. The switch of claim 17, wherein the display is square in shape.

19. The switch of claim 17, wherein the plurality of keypads completely surrounds the display.

20. The switch of claim 17, wherein the second plurality of keypads comprises a first keypad actuatable to activate a lumbar massage function, and a second keypad actuatable to activate a lateral support function.

* * * * *